United States Patent [19]

Shiina

[11] Patent Number: 4,732,514
[45] Date of Patent: Mar. 22, 1988

[54] DEVICE FOR USE IN RESHAPING THE GATE OF A METAL MOULD FOR PLASTIC INJECTION MOULDING

[75] Inventor: Fumiyuki Shiina, Tokyo, Japan

[73] Assignee: Kabushiki Gaisha Sankoh-Chemical, Osaka, Japan

[21] Appl. No.: 914,148

[22] Filed: Oct. 1, 1986

[51] Int. Cl.$^4$ .............................................. B23C 3/16
[52] U.S. Cl. ..................................... 408/86; 408/714; 409/185
[58] Field of Search ................. 408/72 R, 75, 714, 79, 408/85, 86, 113, 115 R, 146, 154, 156, 186, 192, 193, 195, 196, 198, 201, 225, 226, 239 R, 241 R; 409/138, 139, 140, 178, 185, 189; 81/441; 82/33 R; 10/129 P, 129 M; 29/402.06; 279/11 A, 86

[56] References Cited

U.S. PATENT DOCUMENTS

| | | | |
|---|---|---|---|
| 1,016,116 | 1/1912 | Walters | 408/201 |
| 2,522,330 | 9/1950 | Wright | 408/113 |
| 3,302,495 | 2/1967 | Schmid | 408/86 X |
| 3,302,526 | 2/1957 | Chendy et al. | 408/86 X |
| 3,653,780 | 4/1972 | Ammatuna | 408/241 R |

FOREIGN PATENT DOCUMENTS 2040765  9/1980  United Kingdom ............. 10/129 P

Primary Examiner—Z. R. Bilinsky
Attorney, Agent, or Firm—Birch, Stewart, Kolasch & Birch

[57] ABSTRACT

Disclosed is a device for use in reshaping the gate of a metal mould for plastic injection moulding. A device A for reshaping the gate recess 7 of a metal injection mould 3 for plastics injection moulding when the recess has become worn comprises a cylinder 9 containing a body 10 which is biased by a spring 15. A cutting tool 13, 13a is mounted on the front of the body 10 and is shaped to re-cut the recess 7 to the required shape. A pin 14 on the tool 13 fits in the gate 6 to centralize the tool 13. A plate 17 with a recess 16 to receive the tip of an injection nozzle 5 is rotatably mounted on the rear end of the cylinder 9 and holds the rear of the device A centered. In operation the cylinder 9 is rotated manually and turns the body 10 and the tool 13 with it owing to the keyway 11 and screw 12 forming a key. Since the device can be inserted and resiliently held between the metal mould 3 and the nozzle and reshaping is performed simply by rotating the device by hand, it is possible to reshape the recess 7 without removing the mould 3 from the moulding apparatus, thus resulting in a great saving of labor.

2 Claims, 4 Drawing Figures

DEVICE FOR USE IN RESHAPING THE GATE OF A METAL MOULD FOR PLASTIC INJECTION MOULDING

BACKGROUND OF THE INVENTION

1. Field of the Invention

The present invention generally relates to a plastic injection moulding apparatus in which in each cycle of moulding operations, a plastic injecting nozzle is advanced and is pushed against the gate of a metal mould into which plastics material is injected to mould it. More particularly, the present invention relates to a device for reshaping a recessed gateway, that is the sprue bush inlet, of a metal mould to its original shape when the gateway recess has become worn and deformed by repeated contact with the injecting nozzle tip of a plastic moulding apparatus.

2. Description of the Prior Art

When the metal mould has become worn and deformed at its gateway recess, an undesired gap or space appears between the tip of the plastic injecting nozzle and the metal mould when these parts are brought into contact with each other. This allows molten plastics material to leak out and become hard around the undesired gap where it forms an irregular projection from the plastics moulding. When such a plastics moulding is removed from the metal mould, the undesired irregular projection may be disadvantageously trapped by the metal mould preventing release of the moulding. When this happens it is necessary to reshape the worn part of the metal mould to the exact original shape. The required reshaping has been hitherto performed with the aid of a machine tool. To do this, the heavy metal mould must be removed from the injection moulding apparatus and be placed in position in the machine tool. After being reshaped the heavy metal mould must be removed from the machine tool and be put back in position in the injection moulding apparatus. This requires much labour and time, and the moulding work must be interruped all this while. Accordingly the moulding efficiency will be lowered. With this problem in mind, the object of the present invention is to provide a mould reshaping device which permits the reshaping of the gate recess of a metal mould to the exact original shape without removing the mould from the injection moulding apparatus.

SUMMARY OF THE INVENTION

To this end, according to this inventon, a device for reshaping a gate recess of a metal injection mould for accommodating the injection nozzle of a plastics injection moulding apparatus comprises a cylindrical barrel having a longitudinally extending hollow interior space with an open front end; a cylindrical body slidably fitted in the longitudinally extending hollow space of the barrel; a rotary convex edged cutting tool detachably fixed to the front end of the cylindrical body and having a convex blade complementary in shape to the reshaped concave gate recess of the mould; spring means acting between the rear end of the cylindrical body and the rear end of the barrel to bias the front end of the body from the barrel; and a nozzle seat plate rotatably mounted on the rear end of the barrel and having a concave recess complementary, in shape, to a tip of the injection nozzle of the apparatus.

In use, first, the nozzle of the plastics moulding apparatus is withdrawn to leave a space sufficient to accept the reshaping device between the metal mould fixed in the plastics moulding apparatus and the withdrawn nozzle. The rotary cutting tool is placed against the concave gate recess of the metal mould. Then, the nozzle is advanced to push the cutting tool against the metal mould with the nozzle tip fitted in the concave recess of the nozzle seat plate. The advance of the nozzle towards the metal mould is stopped, and at this time the spring is yieldingly compressed to exert a resilient force appropriate for resiliently but firmly holding the device between the metal mould and the nozzle of the plastics moulding apparatus. Then, the barrel is rotated by hand to rotate the cutting tool, thereby reshaping the gate of the metal mould. After shaping the gate recess to the original concave shape, the nozzle is again withdrawn from the metal mould, so that the reshaping device may be removed.

BRIEF DESCRIPTION OF THE DRAWINGS

An example of a device in accordance with the invention is illustrated in the accompanying drawings in which.

DESCRIPTION OF THE PREFERRED EMBODIMENT

Figure 1:
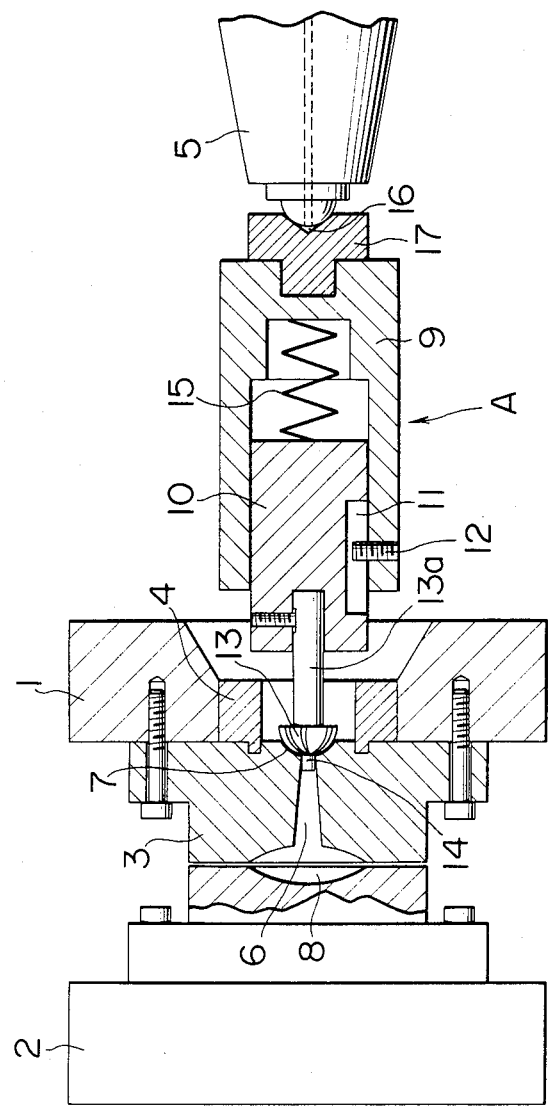
FIG. 1 is a diagrammatic longitudinal section through the device shown in use mounted on a mould.
Figure 2:
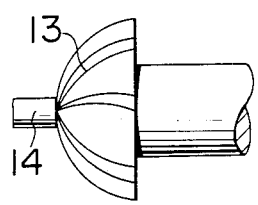
FIG. 2 is a side view of part of a cutting tool forming part of the device.
Figure 3:
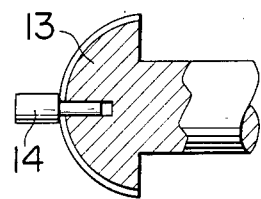
FIG. 3 is a partly sectional view of the tool shown in FIG. 2.
Figure 4:
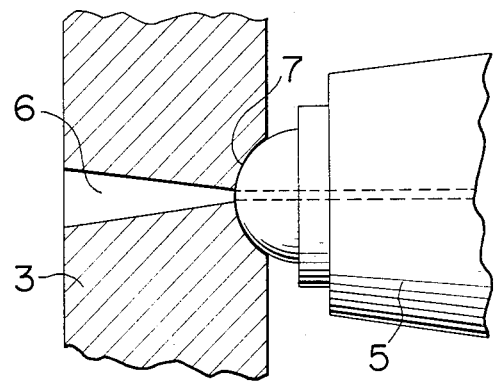
FIG. 4 shows the relationship between the gate of a metal injection mould and the injection nozzle tip of injection moulding apparatus.

As shown in FIG. 1, a plastic injection moulding apparatus has a stationary plate 1 and a movable plate 2 in the opposite relationship to the stationary plate 1. A metal mold 3 is composed of two separate halves, bolted to the stationary plate 1 and the movable plate 2 respectively. A positioning ring which is useful in putting the metal mold 3 at a proper position in the stationary plate 1, is designated at 4.

An injection nozzle of a plastic injection molding apparatus is designated at 5. In operation the tip of the nozzle 5 is pushed against the concave recess or gateway 7, which communicates with the shaping space or cavity 8 through an associated passage 6. Then, a hot flow of molten plastic is supplied to the shaping cavity 8 of the metal mold 3 through the passage 6 to provide a plastic molding.

As shown in FIG. 1, a reshaping device "A" comprises a rotary cylindrical barrel 9, and a slidable cylindrical body 10 fitted in the longitudinal hollow space of the rotary barrel. The slidable body 10 has a longitudinal groove 11 extending parallel to the axis of the rotary barrel 9. A bolt 12 is inserted in a hole made on the wall of the rotary barrel 9 to partly appear in the longitudinal groove 11 of the slidable body 10. A rotary convex edged tool 13 is fixed to the front end of the slidable body 10 by inserting its spindle 13a in the center hole of the slidable body and by driving a screw in a cross hole made in the wall of the slidable body 10. A variety of edged convex tools each having a different blade shape are prepared, and are selectively used to fit in a particular concave shape of the recess 7 of the metal mold 3. As shown, a guide pin 14 may be removably connected to the center of the rotary edged tool about which the tool is to be rotated. Also, a variety of guide pins of different sizes may be prepared, and selectively used to fit in the gate of a particular metal mold. A spring 15 is provided between the inner end of the slidable body 10 and the bottom of the cylindrical barrel 9, thereby resiliently pushing the slidable body outward until the rear end wall of the longitudinal groove 11 of the slidable body 10 is brought in contact with the projecting length of the screw 12. A seat plate 17 is rotatably connected, advantageously by means of bearing, to the rear end of the barrel opposite to the front end of the barrel to which a rotary edged tool 13 is fixed. The seat plate 17 has a concave seat 16.

In scraping and shaping the deformed concave recess of the metal mold 3, the reshaping tool "A" is put in between the metal mold 3 and the nozzle 5 with its spring 15 yieldingly compressed, as shown in FIG. 1. Then, the reshaping tool "A" is automatically put in exact alignment both with the center axis of the gate and passage 6 and the center axis of the nozzle 5 thanks to the insertion of the guide pin 14 in the gateway of the metal mold 3 and the fitting-in of the nozzle tip in the seat recess 16 of the seat plate 17. Thus, the rotary blade 13 is pushed against the recess 7 of the metal mold 3 at right angle.

The rotary barrel 9 is rotated by hand, so that the slidable body 10 and the rotary blade 13 are rotated together, thereby scraping the concave surface of the recess 7 to the exact shape. After shaping, the nozzle 5 is withdrawn to remove the reshaping device "A". If the barrel of the reshaper is equipped with a handle (not shown) for the urpose of increasing rotating torque, the barrel will be rotated yb a reduced force.

When it is desired that the tip of a nozzle 5 be reshaped, a concave cutter may be put in place of a convex one 13 at the end of the slidable body 10, and a convex seat plate having a convex projection complementary to the concave recess of the metal mold may be fixed in place of the concave seat plate 17 at the rear end of the barrel 9. Then, the device is put between the metal mold 3 and the nozzle 5 of the plastic injecting apparatus with its convex seat plate and concave cutter pushed against the concave recess of the metal mold and the nozzle, respectively, just opposite to the situation as shown in FIG. 1.

As described above, required reshaping can be performed simply by rotating the barrel of a reshaping tool which is put between the metal mold 3 and the nozzle 5 with its cutter blade 13 resiliently biased and pushed against the concave recess 7 of the metal mold, thus eliminating the necessity of removing the heavy metal mold 3 from the plastic molding apparatus for reshaping the concave gate recess of the metal mold. Accordingly, the amount of work and time which otherwise would be consumed by removing and reshaping the heavy metal mold, can be saved. The reshaping work can be performed simply by rotating the barrel 9 by hand, requiring no strong force. Thanks to the complementary fitting each between the rotary convex cutter 13 and the mold concave gate recess 7 and between the concave seat plate 17 and the convex nozzle tip, the barrel 9 of the reshaping tool "A" can be automatically put exactly in alignment with the nozzle and the metal mold, so that the rotary blade 13 may be pushed against the concave recess 7 at right angle. The convex shape of the rotary blade is exactly in conformity with the concave shape of the recess, and therefore a somewhat deformed mold recess can be machined to the exact original shape.

What is claimed is:

1. A device for reshaping a gate recess of a metal injection mould for accommodating the injection nozzle of a plastics injection moulding apparatus, the device comprising;

a cylindrical barrel having a longitudinally extending hollow interior space with an open front end;

a cylindrical body slidably fitted in the longitudinally extending hollow space of the barrel;

a rotary convex edged cutting tool detachably fixed to the front end of the cylindrical body and having a convex blade complementary in shape to the reshaped concave gate recess of the mould;

spring means acting between the rear end of the cylindrical body and the rear end of the barrel to bias the front end of the body from the barrel;

and a nozzle seat plate rotatably mounted on the rear end of the barrel for rotation relative to the barrel and having a concave recess complementary, in shape, to a tip of the injection nozzle of the apparatus.

2. A device according to claim 1, wherein the cutting tool has a guide pin detachably fixed to the centre of the convex front end of the cutting tool, the guide pin having a diameter somewhat less than the diameter of the passage extending from the gate recess to the mould cavity of the metal mould.

* * * * *